(12) United States Patent
Rumpf et al.

(10) Patent No.: US 8,086,798 B2
(45) Date of Patent: Dec. 27, 2011

(54) MULTIMEDIA STORAGE DEVICE

(75) Inventors: Horst Rumpf, Taipei (TW); Stefan Koch, Taipei (TW); Chun-Ting Wu, Taipei (TW); Chih-Kang Chen, Taipei (TW)

(73) Assignee: Philips & Lite-On Digital Solutions Corporation, Neihu District, Taipei (TW)

( * ) Notice: Subject to any disclaimer, the term of this patent is extended or adjusted under 35 U.S.C. 154(b) by 919 days.

(21) Appl. No.: 12/106,344

(22) Filed: Apr. 21, 2008

(65) Prior Publication Data
US 2009/0043964 A1   Feb. 12, 2009

(30) Foreign Application Priority Data
Aug. 7, 2007   (CN) .......................... 2007 1 0143262

(51) Int. Cl.
G06F 13/00 (2006.01)
G06F 13/28 (2006.01)
(52) U.S. Cl. ........................................................ 711/115
(58) Field of Classification Search .................. 711/115
See application file for complete search history.

(56) References Cited

U.S. PATENT DOCUMENTS

| | | | |
|---|---|---|---|
| 3,669,249 A * | 6/1972 | Foster | 206/3 |
| 4,941,841 A | 7/1990 | Darden | |
| 7,039,753 B2 * | 5/2006 | Suzuki et al. | 711/102 |
| 7,658,628 B2 * | 2/2010 | Guan et al. | 439/157 |
| 2003/0012370 A1 * | 1/2003 | Turunen | 379/445 |
| 2003/0093606 A1 * | 5/2003 | Mambakkam et al. | 710/305 |
| 2003/0163627 A1 * | 8/2003 | Deng et al. | 710/305 |
| 2006/0292918 A1 | 12/2006 | Behl | |
| 2006/0294306 A1 * | 12/2006 | Hong | 711/115 |
| 2009/0051869 A1 * | 2/2009 | Chen | 351/155 |

FOREIGN PATENT DOCUMENTS

| | | |
|---|---|---|
| EP | 1 727 141 A2 | 11/2006 |
| EP | 1 727 141 A3 | 11/2008 |

* cited by examiner

*Primary Examiner* — Hoai V Ho
*Assistant Examiner* — Min Huang
(74) *Attorney, Agent, or Firm* — Winston Hsu; Scott Margo

(57) ABSTRACT

The present invention discloses a multimedia storage device comprising a cartridge and a loader. The cartridge connects to media devices of different formats, and the loader comprises a loading/ejecting device and connects to an external application device. The cartridge is loaded into and ejected out of the loader by the loading/ejecting device. When the cartridge is loaded into the loader, the external application device can play and access the files stored in media device.

11 Claims, 3 Drawing Sheets

MULTIMEDIA STORAGE DEVICE

FIELD OF THE INVENTION

The present invention relates to a multimedia storage device, and more particularly to a multimedia storage device capable of accessing and playing the media devices which have different formats.

BACKGROUND OF THE INVENTION

Recently, the media devices including the storage card and the media player are widely used for different applications. For example, the SD (secure digital) card for mobile phone is used to store music and photos, and MP3 (MPEG Layer-3) and MP4 (MPEG-4) player which have different volumes for playing music and video, respectively. CF (compact flash)/MS(Memory Stick)/SD cards are used in the digital cameras.

In order to play and access the storage card and the media player which have different formats, the slots and connectors of the corresponding formats are disposed on the front panel of multimedia player system. For example, USB (Universal Serial Bus) connectors or SD/CF card slots are disposed on the front panel. And when a user needs to access or play the storage card and the media player, the user needs to use a USB line or a serial to USB adaptor to access the media player. Also, the user can directly insert storage card and the media player into the slots disposed on the front panel. After the media player and the storage card are connected to the multimedia player system, the system can play and access the files stored in the media player and the storage card.

But due to the improvement of storage technologies, media players and storage cards which have formats other than the formats in the market are foreseeable. Then, the connector which is corresponding to the new format must be disposed on the front panel to connect the media player and the storage card. However, it is not pleasing to have too many connectors and slots which have different formats on the front panel. Moreover, the internal electrical circuit becomes complicate due to the increasing connectors and slots. Even more, the main body of the multimedia player system needs to be changed and updated when a media device of new format becomes available in the market.

SUMMARY OF THE INVENTION

Therefore, the object of the present invention is to provide a multimedia storage device for accessing and playing the media devices which have different formats. So as the number of connectors and slots are reduced. Moreover, the complicate electrical circuit inside the multimedia player system and not pretty looks of the front panel are avoided. Further, the user does not need to change the main body of the multimedia player system for accessing and playing the media device which has the new format.

The present invention discloses a multimedia storage device including a cartridge and a loader. Connectors and slots are disposed in the cartridge for connecting to the media devices of different formats. The loader has a loading/ejecting device for loading/ejecting the cartridge into/out of the loader. The loader is connected to an external application device for playing and accessing the media device connected in the cartridge.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
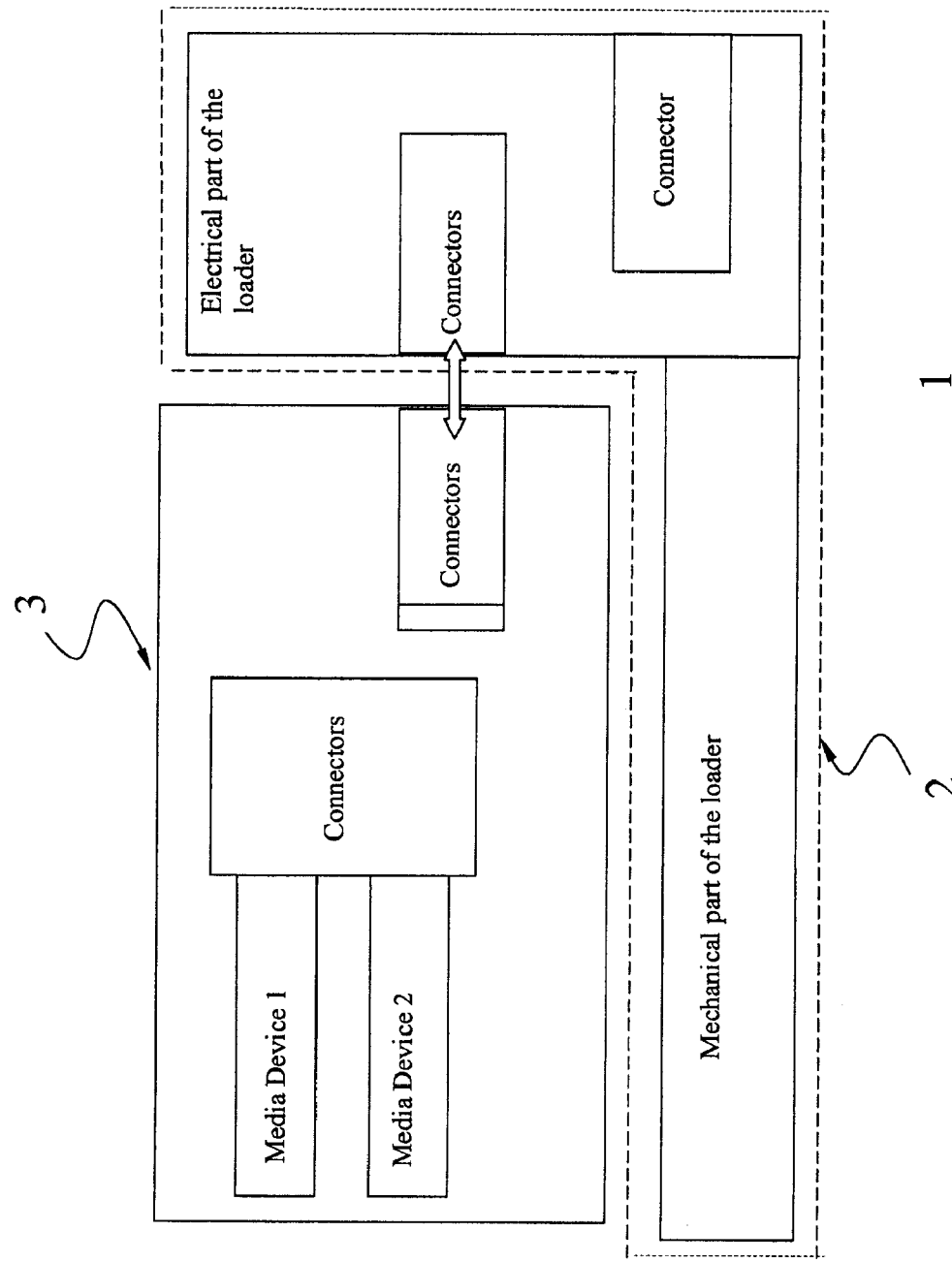
FIG. 1 is a schematic view of a multimedia storage device of the present invention.

Referring to FIG. 1, it is a schematic view of a multimedia storage device of the present invention. The multimedia storage device 1 includes a loader 2 and a cartridge 3. The cartridge 3 has a plurality of connectors for connecting to the media devices. The media devices can be the storage card or the media player. The connectors have different formats corresponding to inserted media devices. For example, the connectors can be a SD card slot, USB connector, or a CF card slot, as show in FIG. 2 and FIG. 3. The loader 2 has a mechanical part and an electrical part. The mechanical part has a loading/ejecting device for loading the cartridge 3 into the loader 2 and ejecting the cartridge 3 out of the loader 2. When the cartridge 3 is loaded into the loader 2, the loading/ejecting device fixes the cartridge 3 in the loader 2 to avoid the cartridge 3 departing from the loader 2. In addition, guide rails are set in the corresponding position of the loader 2 and the cartridge 3. Then the cartridge 3 easily slides into/out of the loader 2.

The cartridge 3 has a connector for connecting to the loader 2 and the loader 2 has a corresponding connector. The loader 2 is electrically connected to an external application device, for example, a computer or a controller of the multimedia player system. Therefore, the external application device can access, control or play the files in media device after the media device is connected to the cartridge 3 and the cartridge 3 is loaded into the loader 2.

Moreover, when the media device connected in the cartridge 3 needs to be recharged, the multimedia storage device 1 can recharge it via the connector.

The cartridge 3 or the loader 2 has a memory. Programs are stored in the memory for playing or accessing the media device. In addition, the programs can recognize the formats of the connected media devices for providing suitable playing programs to play the media devices. For example, when the media device is the MP4 player, the program decodes and plays the video file in the MP4 player. The memory can also store the failure information when the media device fails to connect to the cartridge 3 correctly or the files in the media device are damaged. When the failure information is found in the memory, the multimedia storage device outputs a warning signal in the form of lights or sounds. The warning signal is used to remind the user that the connection may not be correct and the file may be damaged. So the user can check the connection and the files in the media device. Moreover, the user can update the programs via internet or manually so that the device can access the latest format of the media device.

The multimedia storage device 1 has a vibration absorber and a detecting device. When the multimedia storage device 1 is installed in the cars, the vibration absorber absorbs the vibration when the cars are moving. So that the connection between the cartridge 3 and the media device is not loosed and the playing of the video and music is smooth. The detecting device is used to detect whether the connection between the media device and the cartridge 3 is correct or not. When the connection is not correct, the detecting device sends the failure information to the memory and then the warning signal is generated to the user that the user needs to reconnect the media device to the cartridge 3.

Figure 2:
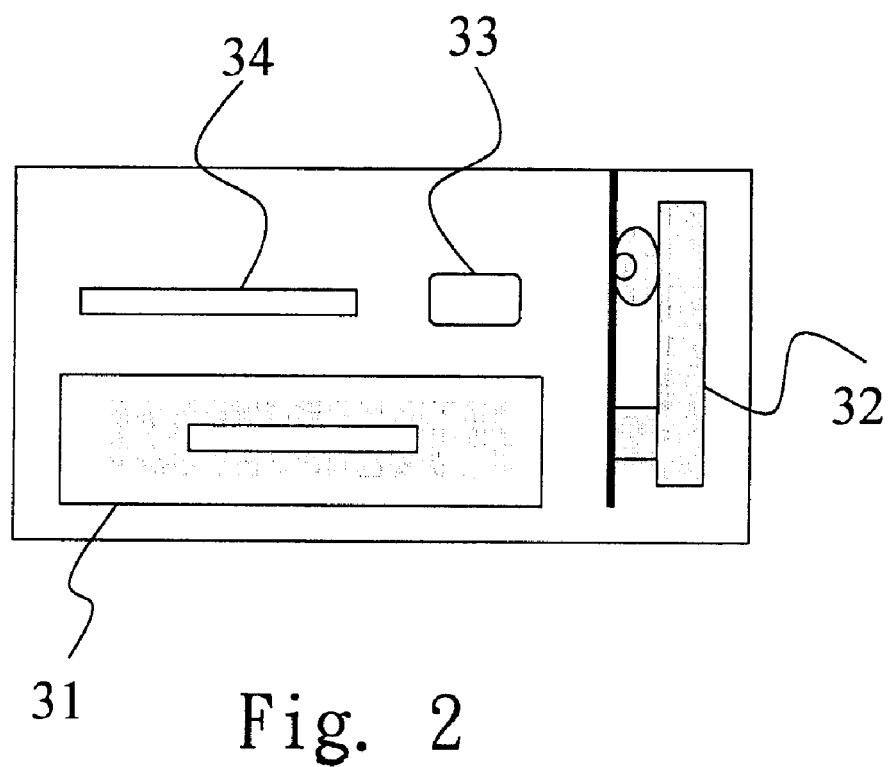
FIG. 2 is a block diagram of the first embodiment of the connector in a cartridge of the present invention.
Figure 3:
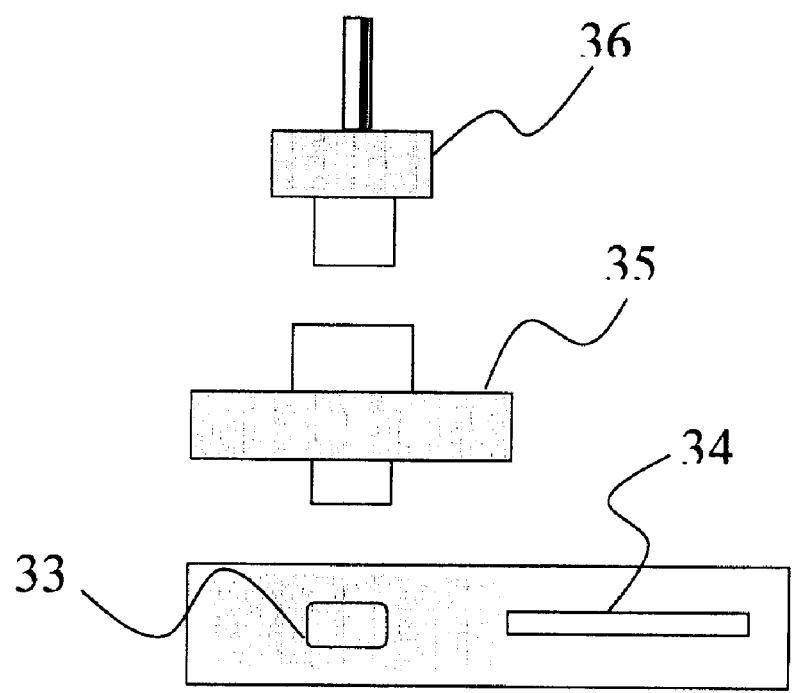
FIG. 3 is a block diagram of the second embodiment of the connector in the cartridge of the present invention.

Referring to FIG. 2 and FIG. 3, the figures show the different embodiments of the connectors. As shown in FIG. 2, the connectors have different formats. For example, the connectors are iPod slot 31, iPod shuffle slot 32, USB connector 33, and SD card slot 34. The user can directly insert the iPod, iPod shuffle, and SD card into the iPod slot 31, iPod shuffle slot 32, and SD card slot 34, respectively. When the connector of the media device is the USB connector, the user uses a USB line to connect to the USB connector 33. In FIG. 3, the connectors of the cartridge 3 are the USB connector 33 and the SD card slot 34. In the second embodiment, the user uses different USB connector bases to connect to the USB connector 33. For example, the USB connector bases can be the iPod connector base 35, iPod shuffle connector base 36. The user connects the iPod to the iPod connector base 35 and then puts the iPod connector base 35 into the USB connector 33. The number and the positional relationship of the connectors and the slots in the cartridge 3 are varied according to the applications.

Figure 4:
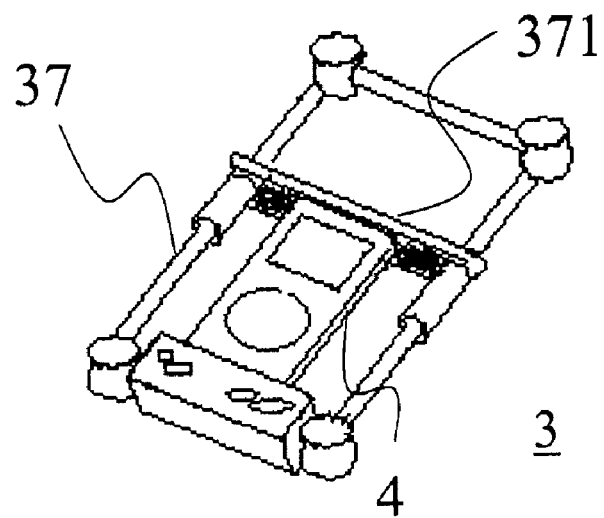
FIG. 4 is a perspective view of the first embodiment of the cartridge fixing a media player of the present invention.
Figure 5:
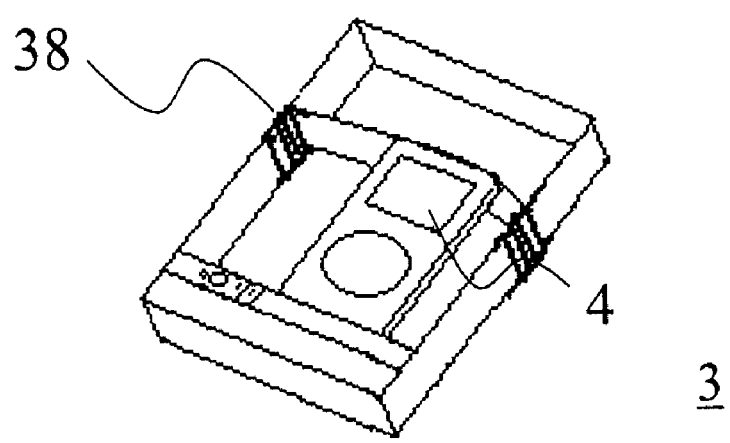
FIG. 5 is a perspective view of the second embodiment of the cartridge fixing the media player of the present invention.

Referring to FIG. 4 and FIG. 5, they show the different embodiments of the cartridge fixing the media device of the present invention. In FIG. 4, the cartridge 3 has a supporting frame 37 and a sliding cover is moved on the supporting frame 37. When the media device 4 is connected to the cartridge 3, the sliding cover 371 is moved to an appropriate position to fix the media device 4. In FIG. 5, an elastic belt 38 is used to fix the media device 4. When the media device 4 is connected to the cartridge 3, the elastic belt 38 is moved to an appropriate position to fix the media device 4 by the elastic force.

As described above, the multimedia storage device can access the media devices of different formats. The multimedia storage device can be installed in the cars or in the multimedia player system for home entertainment. Moreover, the advantage of the present invention is that when a media device of new format becomes available in the market, the user only needs to change the connectors of the cartridge. The whole main body of the multimedia storage device does not need to be changed. Therefore, the difficulty of changing the multimedia player system and the cost of buying new system is avoided. The life-time of the multimedia storage device is also extended.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A multimedia storage device, comprising:
    a cartridge for connecting to a plurality of media devices which have different formats, wherein the cartridge has a frame and an elastic belt moving to an appropriate position on the frame for fixing the media device; and
    a loader including a loading/ejecting device and connecting to an external application device;
    wherein the cartridge is loaded into and ejected out of the loader by the loading/ejecting device and when the cartridge is loaded into the loader, the external application device accesses the files stored in the media device.

2. The multimedia storage device according to claim 1, wherein a memory is installed in the cartridge or loader and is used to store a play/access program for the media device.

3. The multimedia storage device according to claim 2, wherein the memory stores a failure information generated when the connection between the media device and the cartridge is not correct or when the files stored in the media device is damaged.

4. The multimedia storage device according to claim 1, wherein the cartridge has connectors of different formats.

5. The multimedia storage device according to claim 4, wherein the connectors are SD card slot, CF card slot, or USB connector.

6. The multimedia storage device according to claim 4, wherein the media device is recharged by the connector.

7. The multimedia storage device according to claim 1, wherein the multimedia storage device has a vibration absorber for absorbing the vibration of the cartridge.

8. The multimedia storage device according to claim 1, wherein the cartridge is fixed in the loader when the cartridge is loaded into the loader.

9. The multimedia storage device according to claim 1, wherein the media device includes a storage card or a media player.

10. The multimedia storage device according to claim 9, wherein the storage cards are the SD card, CF card or other formats.

11. A multimedia storage device, comprising:
    a cartridge for connecting to a plurality of media devices which have different formats, wherein the cartridge has a supporting frame and a sliding cover sliding to an appropriate position on the supporting frame for fixing the media device; and
    a loader including a loading/ejecting device and connecting to an external application device;
    wherein the cartridge is loaded into and ejected out of the loader by the loading/ejecting device and when the cartridge is loaded into the loader, the external application device accesses the files stored in the media device.

* * * * *